Figure 1:
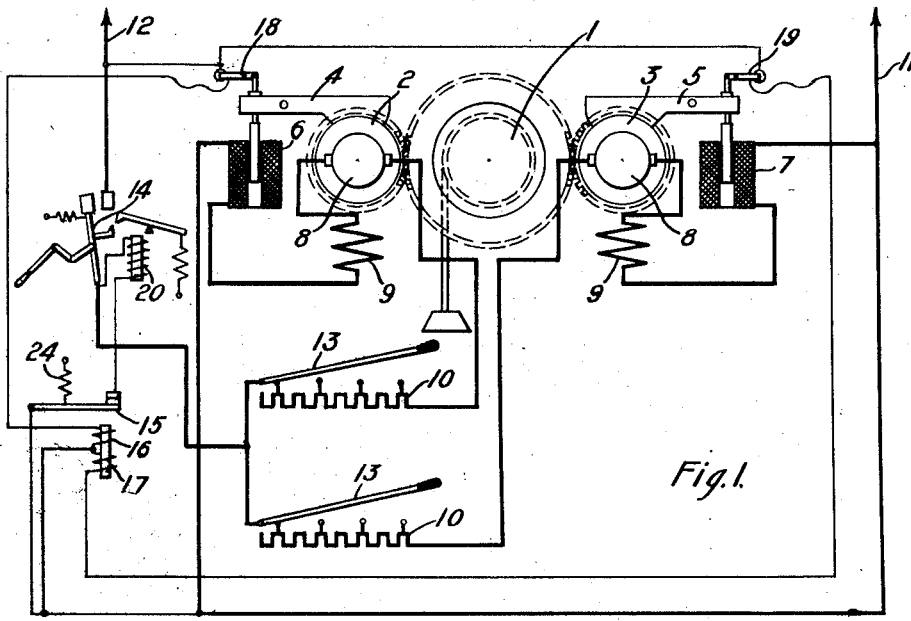

E. S. LAMMERS, Jr.
MOTOR CONTROL SYSTEM.
APPLICATION FILED JAN. 16, 1919.

1,414,422. Patented May 2, 1922.

WITNESSES:
H. J. Shelhamer
David Rines

INVENTOR
Edwin S. Lammers, Jr.
BY
Wesley G. Carr
ATTORNEY

UNITED STATES PATENT OFFICE.

EDWIN S. LAMMERS, JR., OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

1,414,422.  Specification of Letters Patent.  Patented May 2, 1922.

Application filed January 16, 1919. Serial No. 271,473.

*To all whom it may concern:*

Be it known that I, EDWIN S. LAMMERS, Jr., a citizen of the United States, and a resident of Wilkinsburg, in the county of Allegheny and State of Pennsylvania, have invented a new and useful Improvement in Motor-Control Systems, of which the following is a specification.

My invention relates to systems of control and particularly to systems involving a plurality of electric motors designed to run in synchronism.

In systems of the character above designated, the motors are frequently mechanically interconnected and, if they are so energized that they tend to run at different speeds, they may become detached from their foundations. My invention is, however, not restricted to systems in which the motors are mechanically interconnected.

My invention finds special application in cranes and similar apparatus of large size, which are operated by a drum or drums geared direct to two motors, thus making it possible to continue the operation of the drums from one motor. It is the general practice to govern the operation of each motor by a separate controller, usually of the well known contactor type. In a system of this kind, it occasionally occurs that the power to the two motors is not interrupted simultaneously, because of sluggishness of the controlling devices or other causes. One motor shaft is thereby locked, by its brake, against rotation, and the other motor, then exerting a large force, subjects the machinery to severe shocks and strains.

The object of my invention is to provide a system of control for a plurality of motors, whether or not mechanically connected together, whereby the de-energization of one of the motors prior to the de-energization of another motor will be prevented.

According to my invention, a relay is provided for controlling a circuit breaker to cause the simultaneous shutting off of both motors from the source of current supply. The relay has two coils respectively adapted to be controlled in accordance with the position of the controlling devices for the motors. In one of the illustrated embodiments of my invention, this device is the brake itself. In the other, it is the switch for closing the circuit of the motor. The coils may both be normally de-energized or normally energized; if normally energized, they should be differentially arranged so that the fluxes produced by them will normally neutralize each other. Upon the energization in the first case, or the de-energization in the second case, of one of the coils, the relay will be opened to break the circuit of the energizing coil of the circuit-breaker.

Figure 2:
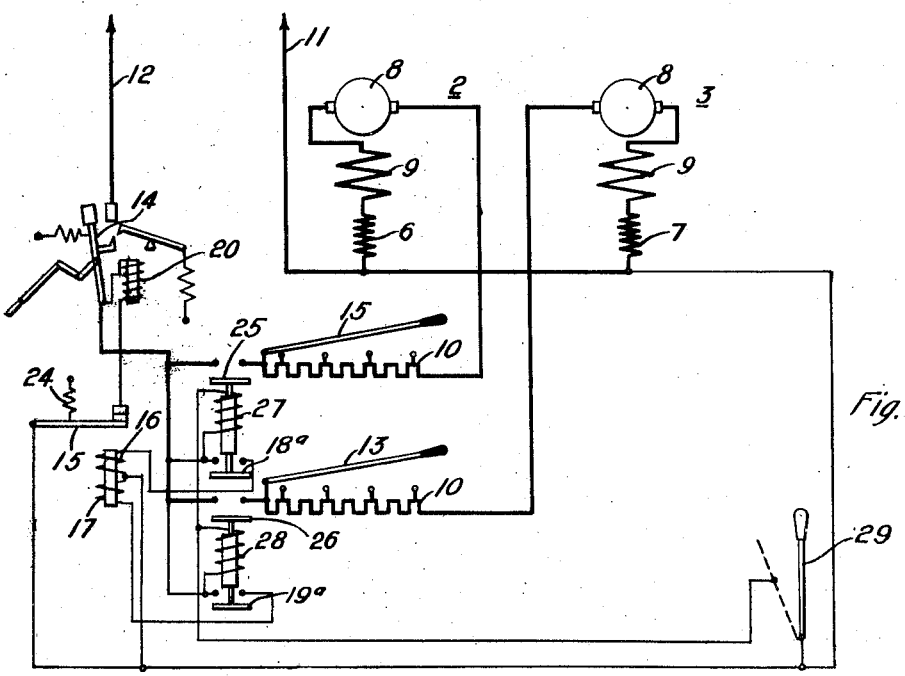

In the drawings, Figure 1 is a diagrammatic view of circuits and apparatus embodying my invention, and Fig. 2 is a similar view of a modification.

In Fig. 1, the crane drum 1 is diagrammatically shown driven by two motors 2 and 3, respectively supplied with brakes 4 and 5, controlled by solenoids 6 and 7. In practice, two drums 1 mechanically geared together, may be employed, the motors 2 and 3 being geared to the respective drums. The drum and motor mechanism has been omitted from Fig. 2 in order to simplify the drawings.

Each of the motors 2 and 3 is supplied with an armature 8, a series field-magnet winding 9 and a variable resistor 10. These and the series brake coils 6 and 7 are preferably connected in parallel circuits extending from the line conductor 11 to the line conductor 12. The resistor may be varied by a controller 13 which, as illustrated in Fig. 1, may be adapted also to close the motor circuit. A circuit breaker or similar switch 14, which is normally maintained closed, is connected in series with the motor circuits in a manner that will be readily understood from the drawings.

A relay 15 is provided with actuating coils 16 and 17 which, in the system of Fig. 1, are respectively controlled by switches 18 and 19, which are mechanically connected to the brakes 4 and 5. The switches 18 and 19 are open when the solenoids 6 and 7 have actuated the brakes and are closed when the brakes occupy their normal operative positions. The relay 15 is normally maintained in the illustrated, closed position by a spring 24 to maintain the circuit of an energizing coil 20 closed, the function of which is to maintain the circuit-breaker 14 closed. When the coil 20 is de-energized, as by the opening of the relay 15, the circuit breaker 14 will be released to open the circuits of the motors 2 and 3.

In the system of Fig. 2, the coils 16 and 17 are respectively controlled by switches 18ª and 19ª which are mechanically connected to switches 25 and 26, which are adapted to close the circuits of the motors 2 and 3. The switches 25 and 26 may be closed by actuating coils 27 and 28, the circuits of which are controlled by a master switch 29.

As will be evident from an inspection of the drawings, the coils 16 and 17 are both de-energized during the normal operation of the motor in the system of Fig. 1, and both are energized in the system of Fig. 2. In the former system, the closing of either switch 18 or switch 19, which will result in the energization of either the coil 16 or the coil 17, will cause the opening of the relay 15, thereby to effect the de-energization of the coil 20. In the system of Fig. 2, the coils 16 and 17 should be differentially wound so that the fluxes produced by them will oppose each other so as to yield no resulting force to act upon the relay 15. Upon the de-energization of either coil 16 or coil 17, the other coil will effect the opening of the relay 15. The coils 16 and 17 of the system of Fig. 1 should also be differentially wound, because they are simultaneously energized through the switches 18 and 19 when the brakes are set.

The operation of the system shown in Fig. 1 may be described as follows: Assuming that the circuit breaker 14 has been closed and the controllers 13 have been actuated to close the circuits of the motors 2 and 3, current will flow from the line conductor 11 through the brake coils 6 and 7, field-magnet windings 9, armatures 8 and resistors 10, in parallel, to the circuit breaker 14 and thence to the line conductor 12. The brake coils will thereupon be energized to release the brakes 4 and 5 and permit the motors to operate. The circuits of the coils 16 and 17, being open at the switches 18 and 19, the relay 15 will be maintained closed by its spring 24. When it is desired to stop the motors, the arms 13 will be actuated to their inoperative positions. If the motor circuits are not simultaneously opened, the one or the other of the coils 6 and 7 will be de-energized first, which will have a tendency to force the entire load upon the motor controlled by the energized brake. Upon the closing of either switch 18 or switch 19, however, one of the coils 16 and 17 is immediately energized to cause the opening of the relay 15 and the consequent opening of the circuit breaker 14 to disconnect both motors 2 and 3 from the source of current. The continued operation, therefore, of one only of the motors is prevented.

The system of Fig. 2 may be started by moving the switch 29 to the broken-line position, whereupon a circuit will be established from the line conductor 11, through the switch 29, the coils 27 and 28, in parallel, and the circuit-breaker 14, to the line conductor 12. The switches 25 and 26 will thereupon be closed to close the circuits of the motors, which extend from the line conductor 11 through the coils 6 and 7, field-magnet windings 9, the armatures 8, the resistors 10 and the switches 25 and 26, in parallel, to the circuit breaker 14 and thence to the line conductor 12. The switches 18ª and 19ª are closed simultaneously with the switches 25 and 26 to cause the energization of the coils 16 and 17. As these coils, when both energized, oppose each other, the relay 15 is permitted to remain closed, in obedience to the force of the spring 24. When it is desired to stop the motors, the switch 29 will be moved to the full-line position, whereupon the coils 27 and 28 will become de-energized to cause the opening of the switches controlled by them. If the switches 25 and 26 were to open simultaneously, the motors would be immediately disconnected from the line. If, for some reason, the switches 27 and 28 were to fail to open simultaneously, the motors would, according to my system, nevertheless, immediately be simultaneously disconnected from the line because that one of the switches 18ª and 19ª which should open first would cause the de-energization of the coil 16 or the coil 17 controlled by it to permit the other coil to cause the opening of the relay 15 and the consequent opening of the circuit breaker 14.

The motor circuits are thus de-energized together. The danger of one brake setting before the other is thus avoided. Damage to the equipment, caused by the one brake setting before the other and acting as a fulcrum for the force exerted by the motor which continues to operate is thus prevented.

Although I have illustrated different practical applications, it will be understood that my invention is not limited thereto and I desire, therefore, that my invention shall be construed broadly, except insofar as limitations may be specifically imposed in the appended claims.

I claim as my invention:

1. The combination with a pair of motors and means for controlling each of said motors independently of the other, of means governed by said controlling means for controlling both of said motors.

2. The combination with a pair of motors and a pair of means for controlling each of said motors independently of the other, of a relay for controlling the circuits of both of said motors, said relay having a pair of coils respectively controlled by each of said controlling means.

3. The combination with a pair of motors and a pair of means for respectively controlling each of said motors, of a relay for controlling both of said motors, said relay having a pair of coils, and a pair of switches mechanically connected to each of said controlling means for respectively controlling the circuits of said coils.

4. The combination with a pair of motors and a brake for each of said motors, of means connected to each of said brakes for controlling both of said motors.

5. The combination with a pair of mechanically connected motors and a brake for each of said motors, of a switch for closing the circuits of said motors, a relay for controlling said switch, said relay having a pair of coils, and a switch mechanically connected to each of said brakes for energizing one of said coils.

6. The combination with a pair of electric motors and a switch for controlling each of said motors, of means connected to each of said switches for controlling both of said motors.

7. The combination with a pair of mechanically connected motors, a pair of switches for respectively closing the circuit of said motors and a switch for opening the circuits of both of said motors, of a relay for said circuit-opening switch having a pair of opposing coils, and a switch mechanically connected to each of said pair of switches for respectively controlling the circuits of said coils.

8. The combination with a plurality of electric motors operatively connected to the same mechanical load, of means for independently controlling the circuits of the several motors and means controlled by said controlling means for controlling the circuits of said motors simultaneously.

9. The combination with a plurality of electric motors operatively connected to the same mechanical load, of means for independently controlling the circuits of the several motors and electromagnetic means for preventing the independent operation of one motor.

10. The combination with a plurality of electric motors operatively connected to the same mechanical load, of means for independently controlling the circuits of the several motors and electromagnetic means for controlling the operation of all of said motors simultaneously.

11. The combination with a plurality of electric motors permanently connected for simultaneous operation, of separate means for controlling the operation of each of said motors, and means for preventing the independent operation of the respective motors.

In testimony whereof, I have hereunto subscribed my name this 4th day of Jan., 1919.

EDWIN S. LAMMERS, Jr.